United States Patent
Haessler et al.

(10) Patent No.: US 9,113,409 B2
(45) Date of Patent: Aug. 18, 2015

(54) METHOD FOR SYNCHRONIZING A TERMINAL WITH A FREQUENCY OF A RADIO-COMMUNICATIONS NETWORK, CORRESPONDING COMPUTER SOFTWARE PRODUCT, STORAGE MEANS AND TERMINAL

(75) Inventors: Ludovic Haessler, Vincennes (FR); Christophe Fléchelle, Colombes (FR)

(73) Assignee: SIERRA WIRELESS, Issy-les-Moulineaux Cedex (FR)

( * ) Notice: Subject to any disclaimer, the term of this patent is extended or adjusted under 35 U.S.C. 154(b) by 669 days.

(21) Appl. No.: 13/117,447

(22) Filed: May 27, 2011

(65) Prior Publication Data
US 2011/0292786 A1   Dec. 1, 2011

(30) Foreign Application Priority Data
May 31, 2010 (FR) ..................................... 10 54199

(51) Int. Cl.
*H04W 4/00* (2009.01)
*H04W 56/00* (2009.01)
*H04B 17/327* (2015.01)
*H04W 28/04* (2009.01)
*H04W 72/00* (2009.01)

(52) U.S. Cl.
CPC ......... *H04W 56/0035* (2013.01); *H04B 17/327* (2015.01); *H04W 28/04* (2013.01); *H04W 72/00* (2013.01)

(58) Field of Classification Search
USPC .................................. 370/329, 338; 455/434
See application file for complete search history.

(56) References Cited

U.S. PATENT DOCUMENTS

| | | | |
|---|---|---|---|
| 7,133,686 B2 * | 11/2006 | Hundal et al. ................ | 455/465 |
| 8,532,605 B2 * | 9/2013 | Bienas et al. ................ | 455/403 |
| 2009/0137267 A1 * | 5/2009 | Nader et al. ............... | 455/552.1 |
| 2011/0117911 A1 * | 5/2011 | Narang et al. ............... | 455/434 |
| 2012/0052858 A1 * | 3/2012 | Mohseni et al. ............. | 455/425 |
| 2013/0051214 A1 * | 2/2013 | Fong et al. .................... | 370/216 |

FOREIGN PATENT DOCUMENTS

| WO | 2007124564 A1 | 11/2007 |
|---|---|---|
| WO | 2008107264 A1 | 9/2008 |
| WO | 2010031725 A1 | 3/2010 |

OTHER PUBLICATIONS

French Search Report dated Jan. 17, 2011 for corresponding French Application No. FR 1054199, filed May 31, 2010.

* cited by examiner

*Primary Examiner* — Mark Rinehart
*Assistant Examiner* — Matthew Hopkins
(74) *Attorney, Agent, or Firm* — David D. Brush; Westman, Champlin & Koehler, P.A.

(57) ABSTRACT

A method and apparatus are provided for synchronizing a terminal with a frequency from an ordered initial sequence of frequencies of a radio-communications network. An available power spectrum associates to each frequency of the initial sequence a power value representing the power with which the frequency is received by the terminal. At least one first range of consecutive frequencies is determined within the initial sequence, having a power variation below a first predetermined threshold. The terminal attempts at least one first synchronization with a frequency of the first range. If each first synchronization fails, the terminal obtains a modified sequence by modifying the position of the frequency or frequencies of the at least one first range of the initial sequence or by eliminating the at least one first range. The terminal then attempts a second synchronization with at least one of the frequencies of the modified sequence.

11 Claims, 3 Drawing Sheets

METHOD FOR SYNCHRONIZING A TERMINAL WITH A FREQUENCY OF A RADIO-COMMUNICATIONS NETWORK, CORRESPONDING COMPUTER SOFTWARE PRODUCT, STORAGE MEANS AND TERMINAL

CROSS-REFERENCE TO RELATED APPLICATIONS

None.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The field of the disclosure is that of radio-communications systems.

More specifically, the disclosure pertains to a technique for synchronizing a radio-communications terminal with a frequency from among a plurality of frequencies of a radio-communications system.

The technique of the disclosure can be applied especially but not exclusively to all narrow-band radio-communications systems (for example GSM, D-AMPS, TETRA/TETRAPOL and other such systems).

The term "narrow-band radio-communications system" is understood to mean a system comprising communications channels, the bandwidth of which is generally below 500 kHz.

More generally, the disclosure can be applied in all contexts where a synchronization of the terminal is implemented in a narrow-band radio-communications system disturbed by a broadband radio-communications system (for example W-CDMA, UMTS, IS-95, and other such systems) or by any other type of broadband disturbance.

The term "broadband radio-communications system" is understood to mean a system comprising communications channels of a width generally greater than 500 kHz.

BACKGROUND OF THE DISCLOSURE

Here below, the drawbacks of the prior art are illustrated through the particular case of a narrow-band radio-communications system compliant with the GSM standard.

GSM radio access technology is a second-generation mobile telephony technology used for the transmission of voice as well as low-volume digital data, for example, SMS (Short Message Service) texting messages or MMS (Multimedia Message Service) messages.

The area served by a mobile telephony operator of the GSM network is divided into small zones, also called cells.

Each cell has a certain number of narrow-band frequency channels associated with it (for example the GSM-P 900 MHz band comprises 124 duplex channels, the width of each channel being 200 kHz). For each cell, from the set of frequency channels associated with it, we define a respective beacon channel that contains synchronization channels (especially the FCCH or Frequency Correction Channel, SCH or Synchronization Channel, BCCH or Broadcast Control Channel) enabling the radio-communications terminals to detect the presence of base stations.

To communicate, the radio-communications terminal sets up a radio link with one or more base stations. From the base station, the communication then passes to the radio-communications management centre through microwave links or lines.

The beacon channel (and therefore the synchronization channels) are carried by a beacon frequency on which a modulated signal of constant power is sent out constantly, enabling the radio-communications channels to carry out, for example, power measurements.

The beacon frequency has a twofold role: a role of an analog beacon frequency (for frequency and time adjustment and power measurement) and a role of a digital beacon frequency (providing "system" information to the corresponding cell).

The beacon frequency is sent out continuously (by the corresponding base station) and conveys a variety of data in TDMA (Time Division Multiple Access) mode on a particular time slot, especially synchronization data and Public Land Mobile Network (PLMN) subscription network identification data.

The beacon frequency can be identified by an ARFCN (Absolute Radio Frequency Channel Number).

A radio-communications terminal is capable of examining the beacon frequencies of different cells when it is powered on or when it is a standby state or when a communication link is set up.

Classically, when a GSM terminal wishes to communicate through the GSM network, it must search for a beacon frequency and decode it (the decoding of a beacon frequency enables it to confirm that it is situated in a cell of the GSM network) and thus get synchronized with the base station generating this beacon frequency.

In the context of this synchronization, in a first phase, the terminal carries out a measurement of the reception power of all the beacon frequencies that it receives by scanning the entire GSM frequency band with a 200 kHz step (for example the GSM-P 900 MHz band which extends from 890 MHz to 915 MHz includes 124 possible beacon frequencies associated with 124 duplex channels). At the end of this scanning operation, the terminal obtains a table of the frequencies belonging to the GSM band and their respective associated power values. Thus, the terminal has a power spectrum 10 (as illustrated in FIG. 1) associating, with each frequency of the frequency table, a power value representing the power with which the frequency is received by the terminal. In FIG. 1, the ARFCN numbers of the beacon frequencies 11 received by the terminal are represented on the x-axis and the reception power levels 12 (expressed in decibels) are represented on the y-axis.

In a second phase, the terminal sorts out the beacon frequencies measured and arranges them in descending order of reception power level. Thus, the terminal obtains a classification of beacon frequencies sorted out by descending order of reception power.

Then, in a third phase, the terminal tries out, one by one, the beacon frequencies sorted out in descending order of reception power until it is able to decode a beacon frequency (i.e. obtain the synchronization and identification data conveyed by this beacon frequency) and thus get synchronized with this beacon frequency.

There are situations where a narrow-band radio-communications system can be disturbed by one or more broadband radio-communications systems.

For example, in the United States, the GSM system is disturbed by broadband radio access systems, for example, of the CDMA type. Thus, certain frequency ranges of the GSM band are liable to be used by CDMA radio access systems.

In such situations, the major drawback of the classic synchronization technique (described here above) lies in the fact that the GSM terminal will attempt to get synchronized on frequencies liable to be used by broadband radio access systems whereas these frequencies are not "true" beacon frequencies of the GSM network, i.e. they convey no synchronization information by which the terminal can get synchronized with the GSM network. This therefore leads to a loss of time for the effective synchronization of the GSM terminal on a beacon frequency of the GSM network.

For example, taking the width of a GSM communications channel to be 200 kHz, if a broadband radio access technology is used on 8 MHz of the GSM band, then this broadband radio access technology uses 40 frequencies (i.e. 8 MHz/0.2 MHz) of the GSM band. Assuming that the GSM terminal takes about 1.5 seconds per frequency decoding attempt, the attempt to decode these 40 frequencies may lead to a loss of time of about 60 seconds (i.e. 40×1.5 seconds) in the process of synchronization of the terminal, and may even make synchronization impossible.

However, in mobile communications, it is important that the synchronizing of a radio-communications terminal with a cell should be as speedy as possible in order to provide the user with a communications link as soon as possible.

Furthermore, another drawback of these decoding attempts made on non-decodable beacon frequencies is that they give rise to unnecessary power consumption by the radio-communications terminal, which needs to conserve the power that it has available to it.

SUMMARY

One particular embodiment of the disclosure proposes a method for synchronizing a terminal with a frequency from among an ordered initial sequence of frequencies of a radio-communications network, the terminal having available a power spectrum associating, to each frequency of the initial sequence a power value representing the power with which the frequency is received by the terminal. The terminal is such that it performs steps for:
- determining at least one first range of consecutive frequencies within the initial sequence, associated with a part of the power spectrum that presents a power variation below a first predetermined threshold;
- attempting at least one first synchronization with a frequency of said at least one first range;
- in the event of failure of each first synchronization, obtaining a modified sequence by modifying the position of the frequency or frequencies of said at least one first range of the initial sequence or by eliminating said at least one first range of the initial sequence;
- attempting a second synchronization with at least one of the frequencies of the modified sequence.

The general principle of an exemplary embodiment of the disclosure includes determining, from among the frequencies of the network, those frequencies that entail a risk of failure of synchronization (i.e. the frequencies on which the terminal has little likelihood of getting synchronized successfully) and of relegating them to a lower rank in the initial sequence (for example the frequencies with which the terminal has little chance of getting successfully synchronized are shifted to the end of the initial sequence) or eliminating them from the initial sequence.

It is therefore proposed to determine one or more consecutive ranges of frequencies, each associated with one part of the spectrum where the power variation is below a first predetermined threshold. Thus, with a judicious choice of the value of the first threshold, it is possible to determine first consecutive ranges of frequencies associated with parts of the spectrum where the power is appreciably constant. Then, a synchronization is attempted on one or more frequencies of these first ranges of frequency. In a first embodiment, in the event of failure of synchronization with all or part of the frequencies of a first range of frequencies, this first range of frequencies is eliminated from the initial sequence. In a second embodiment, in the event of failure of synchronization with all or part of the frequencies of a first range of frequencies, the position of the frequencies of the first range of frequencies in the initial sequence is modified. For example, they are shifted to the end of the initial sequence.

Thus, a terminal is prevented from trying to get synchronized with all the frequencies belonging to a first range of frequencies showing a risk of failure of synchronization.

Thus, this embodiment of the disclosure enables the terminal to get synchronized more speedily with a frequency of the network.

Furthermore, this embodiment of the disclosure reduces the energy consumption of the terminal when it is being synchronized on the network.

Advantageously, the frequency with which said at least first synchronization is attempted is associated with a power value above a second predetermined threshold.

A judicious choice of the value of the second threshold makes the terminal more reactive, i.e. the first range or ranges of frequencies to be eliminated or relegated to a lower position in the initial sequence can be determined more rapidly and, at the same time, the number of synchronization attempts is minimized.

A synchronization attempt can thus be made solely on frequencies that are each associated with a high power value (for example above −80 dBm).

According to one advantageous characteristic, said at least one first range is furthermore such that it possesses a bandwidth greater than a third predetermined threshold.

Thus, the number of first synchronization attempts is reduced.

Advantageously, the step for attempting at least one first synchronization comprises steps for:
- determining at least one second range of consecutive frequencies within said at least one first range;
- attempting a first synchronization with each frequency of said at least one second range.

Thus, a synchronization attempt is made on one (or more) sets of contiguous frequencies (called a second frequency range) of a first range of frequencies. This confers reliability on the decision on eliminating this first range of frequencies of the initial sequence.

According to one advantageous characteristic, said at least one second range is such that it has a bandwidth greater than a fourth predetermined threshold.

Thus, the number of first synchronization attempts is reduced.

Advantageously, said radio-communications network is compliant with a standard belonging to the group comprising: the GSM standard, the D-AMPS standard and the TETRA/TETRAPOL standard.

In another embodiment, the disclosure pertains to a computer program product comprising program code instructions to implement the above-mentioned method (in any one of its different embodiments) when said program is executed on a computer.

In another embodiment, the disclosure pertains to a computer-readable storage means storing a computer program comprising a set of instructions executable by a computer to implement the above-mentioned method (in any one of its different embodiments).

In one particular embodiment of the disclosure, there is proposed a terminal comprising means of synchronization with a frequency from an ordered initial sequence of frequencies of a radio-communications network, the terminal having available a power spectrum associating to each frequency of the initial sequence a power value representing the power with which the frequency is received by the terminal. The terminal comprises:

means for determining at least one first range of consecutive frequencies within the initial sequence, associated with a part of the power spectrum that presents a power variation below a first predetermined threshold;

means for attempting at least one first synchronization with a frequency of said at least one first range;

means for obtaining a modified sequence, activated in the event of failure of each said first synchronization, said modified sequence being obtained by modifying the position of the frequency or frequencies of said at least one first range of the initial sequence or by eliminating said at least one first range of the initial sequence;

means for attempting a second synchronization with at least one of the frequencies of the modified sequence.

Advantageously, the terminal comprises means for implementing steps of the method as described here above, in any one of its different embodiments.

BRIEF DESCRIPTION OF THE DRAWINGS

Other features and advantages shall appear more clearly from the following description of a particular embodiment, given by way of a simple, illustrative and non-exhaustive example, and from the appended drawings, of which.

DETAILED DESCRIPTION OF ILLUSTRATIVE EMBODIMENTS

A technique is proposed for rapidly and efficiently synchronizing a radio-communications terminal in a narrow-band radio-communications network in which certain frequencies of the network are used by one or more broadband radio access technologies.

The description here below is situated in the particular case of a GSM terminal seeking to communicate through a GSM communications network (and therefore seeking to get synchronized with a frequency of the GSM network). The GSM network is associated with a frequency band (here below called a "GSM band") which for example may be the "GSM 900 MHz" band ranging from 890 MHz to 915 MHz.

Naturally, it is possible to envisage the implementing of the method according to an exemplary embodiment in a network other than the GSM 900 network. For example, it is possible to envisage implementing the method in a D-AMPS network (in which the width of each communications channel is 30 kHz) or in a TETRA network (in which the width of each communications channel is 25 kHz). The method is also applicable for example to all the frequency bands defined in specifications such as the 3GPP 45.005 specification, namely the GSM400, GSM450, GSM710, GSM750, T-GSM810 and GSM850 bands. The method can also be implemented to synchronize a multi-band terminal capable of communicating for example through two distinct narrow-band radio-communications networks.

Figure 2:
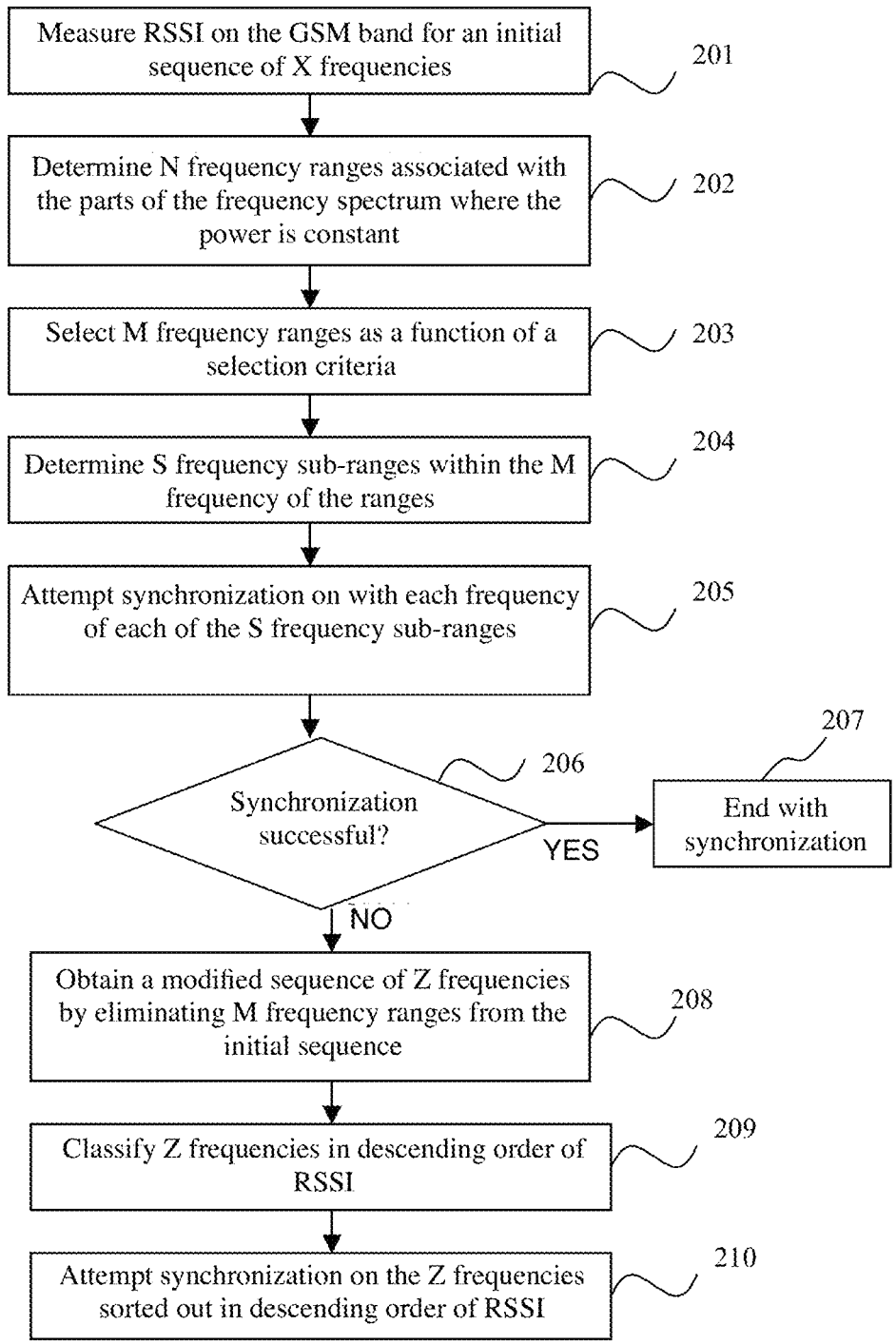
FIG. 2 presents the main steps of an algorithm implementing the synchronization method according to a particular embodiment of the disclosure.

Here below, referring to FIG. 2, we describe the main steps of an algorithm implementing the synchronization method according to one particular embodiment of the disclosure.

In a first step 201, the terminal measures an indicator of the power received (or power value received) by the terminal in the cell in which it is situated, for example an RSSI (received signal strength indicator), for a series of beacon frequencies (here below also called an initial ordered sequence of frequencies) corresponding to a scanning of the entire GSM band with a 200 kHz step.

Figure 1:
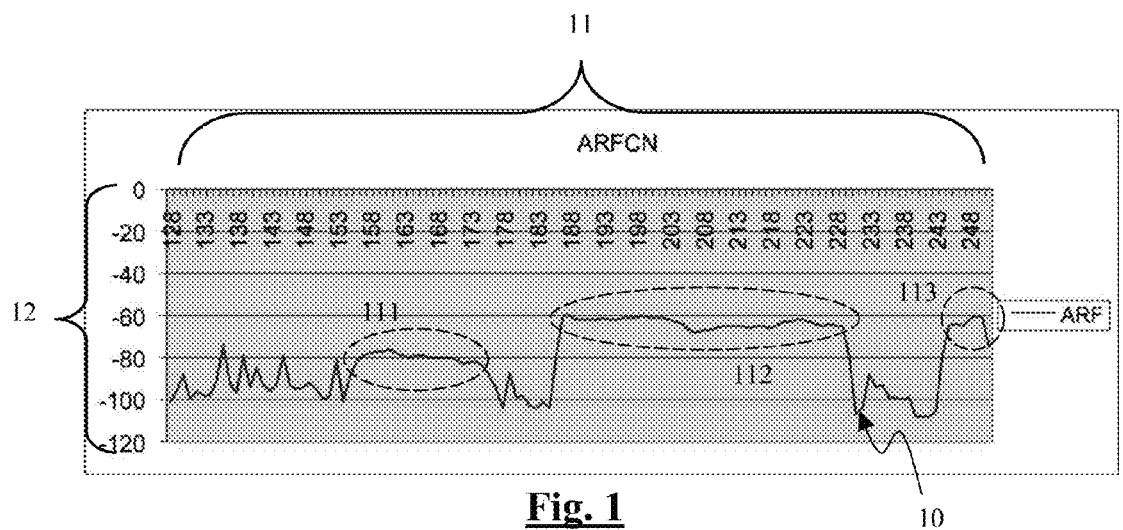
FIG. 1 shows an example of a power spectrum of a GSM band.

Thus, at the end of the first step 201, the terminal obtains the RSSI values for the initial ordered sequence of frequencies, these values forming a power spectrum 10 as illustrated in FIG. 1. This power spectrum 10 associates a power value with each frequency of the initial sequence, this power value representing the power with which the frequency is received by the terminal.

The set of beacon frequencies (of the initial sequence) associated with their respective RSSI value is saved for example in a frequency table within the terminal.

At the step 202, the power spectrum 10 is analyzed in order to determine the beacon frequencies (of the GSM band) that could be used by broadband radio access technologies.

At this step 202, the terminal detects one or more parts in the frequency spectrum 10 that show a power variation below a predetermined threshold. For example, the predetermined threshold is equal to 8 dB. Thus, it is possible to detect the parts 111, 112, and 113 of the spectrum where the power is appreciably constant.

Then the terminal determines, within the initial sequence, the consecutive frequency range or ranges (here below also called the first frequency ranges) associated with the part or parts of the spectrum where the power is appreciably constant.

Figure 3:
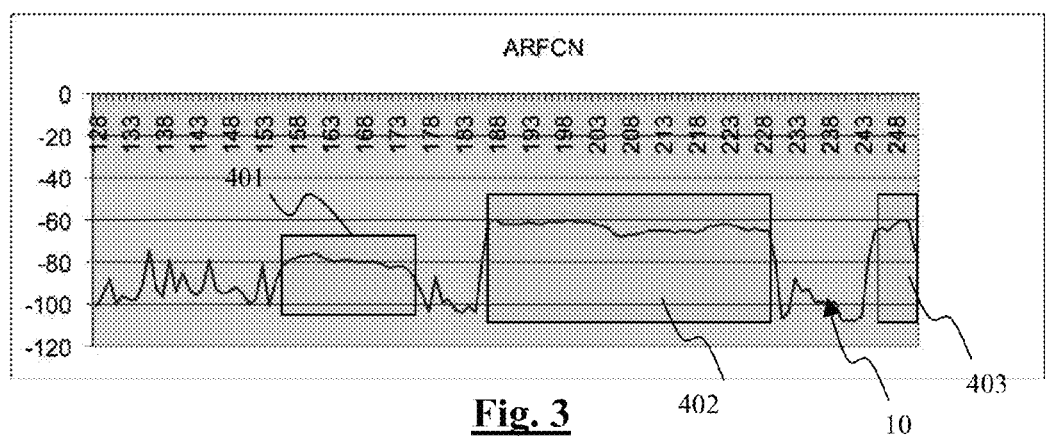
FIG. 3 shows a step for determining first frequency ranges.

For example, and as illustrated in FIG. 3, at the end of the step 202, the terminal determines three frequency ranges 401, 402 and 403. The frequency range 401 includes the frequencies ranging from the ARFCN number 153 to the ARFCN number 173. The frequency range 402 includes the frequencies ranging from the ARFCN number 188 to the ARFCN number 228. The frequency range 403 includes the frequencies ranging from the ARFCN number 243 to the ARFCN number 249.

At the step 203, the terminal selects one or more frequency ranges from amongst the three frequency ranges 401, 402 and 403 as a function of selection criteria applied to the bandwidths and to the power values associated with the frequency ranges 401, 402 and 403. It must be noted that this step 203 can be optional.

For example, from the three frequency ranges 401, 402 and 403, the terminal selects that frequency or those frequencies possessing for example a bandwidth greater than 1 MHz and frequencies associated with power values greater than −80 dBm. Thus, at the end of the step 203, the terminal selects the frequency ranges 402 and 403. The frequency range 401 cannot be selected because it possesses frequencies associated with power values below −80 dBm.

At the step 204, this terminal selects one or more frequency sub-ranges (here below also called second frequency ranges) within each range of frequencies 402 and 403 selected at the end of the step 203.

Figure 4:
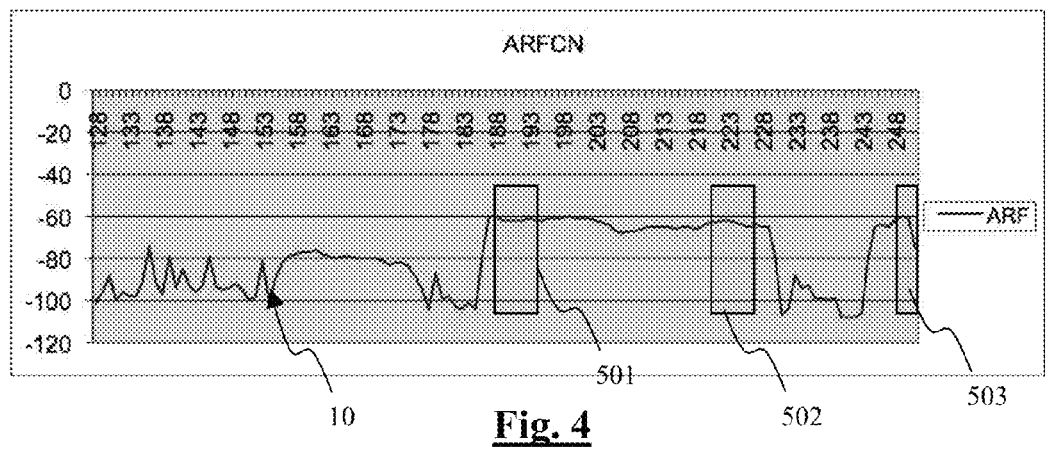
FIG. 4 shows a step for determining second frequency ranges within first frequency ranges.

For example, and as illustrated in FIG. 4, at the end of the step 204, the terminal selects two frequency sub-ranges 501 and 502 within the frequency range 402 and one frequency sub-range 503 within the frequency range 403. The frequency sub-range 501 includes the frequencies ranging from the ARFCN number 188 to the ARFCN number 192. The frequency sub-range 502 includes the frequencies ranging from the ARFCN number 218 to the ARFCN number 222. The frequency sub-range 503 includes the frequencies ranging from the ARFCN number 245 to the ARFCN number 249.

At the step 205, the terminal attempts a synchronization with each frequency of each frequency sub-range 501, 502 and 503. For example, for the frequency sub-range 501, the terminal tries to decode the five frequencies ranging from the ARFCN number 188 to the ARFCN number 192 one by one with the aim of obtaining the PLMN synchronization and identification data that could enable it to get synchronized with a cell of the GSM network.

At the step 206, a test is made to check on whether one of the synchronization attempts (made at the step 205) has been successful.

In the event of a positive check at the test of the step 206 (successful synchronization), the algorithm ends at the step 207. In one particular embodiment, following a positive check with the test at the step 206, a check is made on synchronization criteria. For example, a check is made to see if the terminal has successfully got synchronized with a beacon frequency managed by a predetermined mobile telephony operator. In the event of a negative check, the operation returns to the beginning of the step 205.

In the event of a negative check with the test of the step 206 (synchronization failure), the terminal estimates that the frequency ranges 402 and 403 to which the frequency sub-ranges 501, 502 and 503 belong are being used by broadband radio access technologies (since none of the attempts at synchronization with the frequencies of these frequency sub-ranges 501, 502 and 503 has been successful), and eliminates (step 208) these frequency ranges 402 and 403 from the table of frequencies stored within the terminal. Thus, at the end of the step 208, the terminal obtains a modified frequency table (here below also called a modified frequency sequence). In another embodiment, at the step 208, the frequencies of the ranges 402 and 403 are relegated to the end of the frequency table.

It must be noted that the time needed to obtain a modified frequency table is negligible as compared with the time that the terminal would have taken to perform an attempt at synchronization on each frequency of the frequency ranges 402 and 403.

Then, at the step 209, the terminal sorts out the beacon frequencies of the modified frequency table and arranges them in descending order of reception power level. It must be noted that this step 209 can be optional. Indeed, the beacon frequencies of the modified frequency table can remain sorted out by rising order of ARFCN number.

Then, at a step 210, the terminal tries out the beacon frequencies sorted in descending order of reception power one by one until the terminal is able to decode a beacon frequency (i.e. obtain the synchronization and identification data conveyed by this beacon frequency) and thus be synchronized with this beacon frequency.

Thus, the algorithm implementing the synchronization method according to the particular embodiment described with reference to FIG. 2 enables the identification, from among the beacon frequencies of a narrow-band radio-communications network, of those frequencies that are used by one or more broadband radio access technologies in order to eliminate them. Thus, an embodiment of the disclosure prevents the radio-communications terminal from trying to get synchronized with these frequencies. In other words, the method of the disclosure enables a swifter synchronization of the terminal in the network because it reduces the number of attempts at synchronization on frequencies of the network used by one or more broadband radio access technologies.

Figure 5:
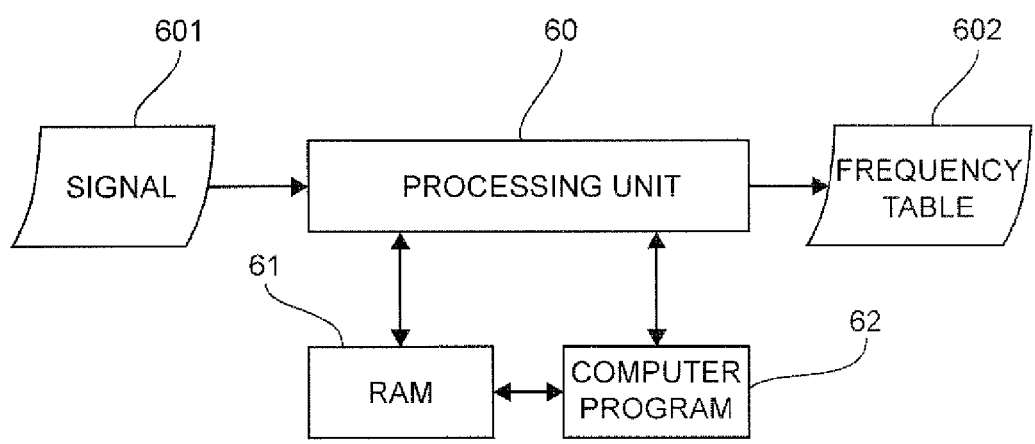
FIG. 5 is a simplified diagram of a terminal compliant with a particular embodiment of the disclosure.

FIG. 5 is a simplified diagram of a terminal according to the particular embodiment of the disclosure comprising a memory 61 (for example a RAM), a processing unit 60 equipped for example with a microprocessor and driven by the computer program (or application) 62 implementing certain steps of the synchronization method described with reference to FIG. 2.

At initialization, the code instructions of the computer program 62 are for example loaded into the RAM 61 and executed by the microprocessor of the processing unit 60. The processing unit 60 inputs the signals 601 coming from the GSM communications channel, available in the cell in which the terminal is situated. The processing unit 60 outputs a modified frequency table 602 which the terminal uses to get swiftly synchronized with a beacon frequency of the GSM network.

Thus, implementing the synchronization method of the disclosure considerably reduces the time taken by a terminal to get synchronized with a base station of a cell belonging to a narrow-band radio-communications network, disturbed by broadband radio-communications systems or by any other type of broadband disturbance.

Furthermore, the implementation of the synchronization method of the disclosure reduces the energy consumption of a terminal when it is getting synchronized with the base station of a cell.

At least one illustrative embodiment of the present disclosure provides a technique for reducing the time taken by a radio-communications terminal to get synchronized with a base station of a cell belonging to a radio-communications network, for example of the GSM type. In other words, it is desirable to provide a technique of this kind through which a radio-communications terminal can get synchronized more speedily with the base station of a cell.

At least one illustrative embodiment provides a technique for reducing the power consumption of a radio-communications terminal when it gets synchronized with the base station of a cell.

At least one illustrative embodiment provides a technique of this kind that is simple to implement and achieves this at low cost.

Although the present disclosure has been described with reference to one or more examples, workers skilled in the art will recognize that changes may be made in form and detail without departing from the scope of the disclosure and/or the appended claims.

What is claimed is:

1. A method for synchronizing a terminal with a frequency from among an ordered initial sequence of frequencies indexed within a frequency table of a radio-communications network, the terminal having available a power spectrum associating to each frequency of the initial sequence a power value representing the power with which the frequency is received by the terminal, wherein the method comprises:
- detecting at least one part of the power spectrum that presents a power variation below a first predetermined threshold;
- determining, within the initial sequence, at least one first range of consecutive indexes of consecutive frequencies of the frequency table, which is associated with said at least one part of the power spectrum;
- attempting at least one first synchronization of the terminal with a frequency of said at least one first range;
- in the event of failure of each of said at least one first synchronization, obtaining a modified sequence by modifying the consecutive indexes of the consecutive frequencies of said at least one first range within the initial sequence; and
- attempting a second synchronization of the terminal with at least one of the frequencies of the modified sequence.

2. The method according to claim 1, wherein attempting at least one first synchronization comprises attempting synchronization at a frequency within the first range that is associated with a power value above a second predetermined threshold.

3. The method according to claim 1, wherein said at least one first range possesses a bandwidth greater than a third predetermined threshold.

4. The method according to claim 1, wherein the step of attempting at least one first synchronization comprises:
- determining at least one second range of consecutive indexes of consecutive frequencies of the frequency table within said at least one first range; and
- attempting a first synchronization with each frequency of said at least one second range.

5. The method according to claim 4, wherein said at least one second range has a bandwidth greater than a fourth predetermined threshold.

6. The method according to claim 1, wherein said radio-communications network is compliant with a standard belonging to the group consisting of: the GSM standard, the D-AMPS standard and the TETRA/TETRAPOL standard.

7. The method according to claim 1, wherein in the event of failure of each of said at least one first synchronization, wherein modifying the consecutive indexes to obtain the modified sequence comprises moving a position of the consecutive frequencies of the consecutive indexes of said at least one first range to a lower rank within the initial sequence.

8. The method according to claim 7, wherein in the event of failure of each of said at least one first synchronization, wherein modifying the consecutive indexes to obtain the modified sequence comprises moving a position of the consecutive frequencies of the consecutive indexes of said at least one first range to an end of the initial sequence.

9. The method according to claim 1, wherein in the event of failure of each of said at least one first synchronization, wherein modifying the consecutive indexes to obtain the modified sequence comprises eliminating the consecutive frequencies of the consecutive indexes of said at least one first range from the initial sequence.

10. A computer-readable memory storing a computer program comprising a set of instructions executable by a computer to implement a method of synchronizing a terminal with a frequency from among an ordered initial sequence of frequencies indexed within a frequency table of a radio-communications network, the terminal having available a power spectrum associating to each frequency of the initial sequence a frequency index and a power value representing the power with which the frequency is received by the terminal, wherein the method comprises:
- detecting at least one part of the power spectrum that presents a power variation below a first predetermined threshold;
- determining, within the initial sequence, at least one first range of consecutive indexes of consecutive frequencies, which is associated with said at least one part of the power spectrum;
- attempting at least one first synchronization with a frequency of said at least one first range;
- in the event of failure of each of said at least one first synchronization, obtaining a modified sequence by modifying a position the consecutive indexes of the consecutive frequencies said at least one first range within the initial sequence; and
- attempting a second synchronization with at least one of the frequencies of the modified sequence.

11. A terminal comprising:
- a memory comprising computer-readable instructions stored thereon;
- an available power spectrum which associates each frequency of an ordered initial sequence of frequencies indexed within a frequency table of a radio-communications network with a power value representing a power with which the frequency is received by the terminal; and
- a processor, coupled to the memory and configured by the instructions to synchronize with a frequency from the ordered initial sequence of frequencies, wherein the processor is configured:
  - to detect at least one part of the power spectrum that presents a power variation below a first predetermined threshold;
  - to determine, within the initial sequence, at least one first range of consecutive indexes of consecutive frequencies of the frequency table, which is associated with said at least one part of the power spectrum;
  - to attempt at least one first synchronization with a frequency of said at least one first range;
  - to obtain a modified sequence, activated in the event of failure of each of said at least one first synchronization, said modified sequence being obtained by modifying a position the consecutive indexes of the consecutive frequencies said at least one first range within the initial sequence; and
  - for attempting a second synchronization with at least one of the frequencies of the modified sequence.

* * * * *